(12) United States Patent
Liu

(10) Patent No.: US 11,323,161 B2
(45) Date of Patent: May 3, 2022

(54) SIGNAL TRANSMISSION BASED ON DOWNLINK CONTROL INFORMATION

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/493,735

(22) PCT Filed: Mar. 21, 2018

(86) PCT No.: PCT/CN2018/079748
§ 371 (c)(1),
(2) Date: Sep. 12, 2019

(87) PCT Pub. No.: WO2018/171614
PCT Pub. Date: Sep. 27, 2018

(65) Prior Publication Data
US 2020/0007201 A1     Jan. 2, 2020

(30) Foreign Application Priority Data

Mar. 24, 2017   (CN) .......................... 201710186498.9

(51) Int. Cl.
| H04B 7/0456 | (2017.01) |
| H04L 5/00 | (2006.01) |
| H04L 25/02 | (2006.01) |
| H04W 72/04 | (2009.01) |
| H04W 80/08 | (2009.01) |

(52) U.S. Cl.
CPC ......... *H04B 7/0456* (2013.01); *H04L 5/0051* (2013.01); *H04L 25/0226* (2013.01);
(Continued)

(58) Field of Classification Search
CPC .................................................. H04B 7/0456
See application file for complete search history.

(56) References Cited

U.S. PATENT DOCUMENTS

| 2012/0176939 A1 | 7/2012 | Qu et al. |
| 2012/0213113 A1 | 8/2012 | Zhao et al. |

(Continued)

FOREIGN PATENT DOCUMENTS

| CN | 101272364 A | 9/2008 |
| CN | 101547066 A | 9/2009 |

(Continued)

OTHER PUBLICATIONS

Extended European Search Report issued in European Application No. 18772433.1 dated Jan. 31, 2020, 10 pages.
(Continued)

*Primary Examiner* — Sithu Ko
*Assistant Examiner* — Won Tae C Kim
(74) *Attorney, Agent, or Firm* — Fish & Richardson P.C.

(57) ABSTRACT

This disclosure describes methods, apparatuses, and systems for signal transmission based on DCI. An example method includes: receiving DCI from a base station, the DCI includes a precoding matrix index, the precoding matrix index belongs to a first index set, wherein the precoding matrix index is used to determine a precoding matrix for transmitting data by the terminal device, each index in the first index set corresponds to a precoding matrix in a first precoding matrix set, a second precoding matrix set comprises a codebook, the first precoding matrix set is a proper subset of the second precoding matrix set, and each precoding matrix index in the first index set has a value that is less than or equal to a quantity of precoding matrices comprised in the first precoding matrix set; and transmitting, by the terminal device, the data according to the precoding matrix index.

12 Claims, 7 Drawing Sheets

(52) U.S. Cl.
CPC ......... *H04W 72/042* (2013.01); *H04W 80/08* (2013.01); *H04L 5/0007* (2013.01)

(56) References Cited

U.S. PATENT DOCUMENTS

| | | | |
|---|---|---|---|
| 2013/0286994 A1 | 10/2013 | Liu | |
| 2014/0044070 A1 | 2/2014 | Chen et al. | |
| 2015/0085692 A1* | 3/2015 | Wang | H04L 5/0048 370/252 |
| 2016/0020846 A1 | 1/2016 | Wang et al. | |
| 2018/0063693 A1* | 3/2018 | Chakraborty | H04W 8/005 |
| 2018/0191410 A1 | 7/2018 | Liu et al. | |
| 2018/0227099 A1 | 8/2018 | Park et al. | |
| 2020/0336182 A1* | 10/2020 | Faxer | H04B 7/065 |

FOREIGN PATENT DOCUMENTS

| | | |
|---|---|---|
| CN | 101789848 A | 7/2010 |
| CN | 102056220 A | 5/2011 |
| CN | 102255643 A | 11/2011 |
| CN | 102595514 A | 7/2012 |
| CN | 103096346 A | 5/2013 |
| CN | 103546241 A | 1/2014 |
| CN | 103563319 A | 2/2014 |
| CN | 103746779 A | 4/2014 |
| JP | 2009542052 A | 11/2009 |
| WO | 2011082570 A1 | 7/2011 |
| WO | 2013015606 A2 | 1/2013 |
| WO | 2013023586 A1 | 2/2013 |
| WO | 2013042982 A1 | 3/2013 |
| WO | 2013147475 A1 | 10/2013 |
| WO | 2014161166 A1 | 10/2014 |
| WO | 2015047333 A1 | 4/2015 |
| WO | 2017020201 A1 | 2/2017 |
| WO | 2017031672 A1 | 3/2017 |

OTHER PUBLICATIONS

Huawei et al., "UL codebook design in NR," 3GPP TSG RAN WG1 Meeting #88, R1-1701686, Athens, Greece, Feb. 13-17, 2017, 4 pages.
Intel Corporation, "On Codebook Based UL Subband Precoding," 3GPP TSG RAN WG1 Meeting #88, R1 -1702192; Athens, Greece, Feb. 13-17, 2017, 3 pages.
ZTE et al., "Codebook based UL transmission," 3GPP TSG RAN WG1 Meeting #88, R1-1701792; Athens, Greece, Feb. 13-17, 2017, 3 pages.
Office Action issued in Chinese Application No. 201880018945.2 dated Apr. 16, 2020, 15 pages (with English translation).
Office Action issued in Chinese Application No. 201811071510.2 dated Apr. 22, 2019, 13 pages (with English translation).
Office Action issued in Chinese Application No. 201811068582.1 dated Jan. 16, 2020, 6 pages (with English translation).
Office Action issued in Chinese Application No. 201811068582.1 dated May 23, 2019, 16 pages (with English translation).
Office Action issued in Chinese Application No. 201811068582.1 dated Jul. 29, 2019, 19 pages (with English translation).
PCT International Search Report and Written Opinion issued in International Application No. PCT/CN2018/079748 dated May 30, 2018, 18 pages (with English translation).
3GPP TS 36.212 V14.2.0 (Mar. 2017), "3rd Generation Partnership Project; Technical Specification Group Radio Access Network; Evolved Universal Terrestrial Radio Access (E-UTRA); Multiplexing and channel coding (Release 14)," Mar. 2017, 197 pages.
3GPP TS 36.211 V14.2.0 (Mar. 2017), "3rd Generation Partnership Project; Technical Specification Group Radio Access Network; Evolved Universal Terrestrial Radio Access (E-UTRA); Physical channels and modulation(Release 14)," Mar. 2017, 197 pages.
Office Action issued in Korean Application No. 2019-7028251 dated Nov. 23, 2020, 9 pages (with English translation).
Office Action issued in Japanese Application No. 2019-552107 dated Dec. 8, 2020, 6 pages (with English translation).
Ericsson, "Clarification on SRS antenna port," 3GPP TSG RAN WG1 Meeting #74bis, R1-134663, Guangzhou, China, Oct. 7-11, 2013, 2 pages.
Extended European Search Report issued in European Application No. 21154666.8 dated Oct. 5, 2021, 8 pages.

\* cited by examiner

SIGNAL TRANSMISSION BASED ON DOWNLINK CONTROL INFORMATION

This application is a national stage of International Application No. PCT/CN2018/079748, filed on Mar. 21, 2018, which claims priority to Chinese Patent Application No. 201710186498.9, filed on Mar. 24, 2017. Both of the aforementioned applications are incorporated herein by reference in their entireties.

TECHNICAL FIELD

This application relates to the field of communications technologies, and in particular, to a method and an apparatus for transmitting a reference signal, and a method and an apparatus for receiving a reference signal.

BACKGROUND

In a 3rd Generation Partnership Project (3rd Generation Partnership Project, 3GPP) Long Term Evolution (Long Term Evolution, LTE) or LTE-advanced (LTE-advanced, LTE-A) system, an orthogonal frequency division multiple access (orthogonal frequency division multiple access, OFDMA) mode is generally used as a downlink multiple access mode. Downlink resources of the system are divided into a plurality of orthogonal frequency division multiplexing (orthogonal frequency division multiplexing, OFDM) symbols in terms of a time domain, and are divided into several subcarriers in terms of a frequency domain.

Generally, a normal uplink or downlink subframe includes two timeslots (slot), and each timeslot includes seven OFDM symbols. Therefore, a normal uplink or downlink subframe includes 14 OFDM symbols in total. In addition, a size of a physical resource block (physical resource block, PRB) is also defined in the system. An RB includes 12 subcarriers in a frequency domain, and has duration of a half subframe (one timeslot) in a time domain, that is, includes seven OFDM symbols (symbol). A timeslot with a length of a normal cyclic prefix (cyclic prefix, CP) includes seven OFDM symbols, and a timeslot with a length of an extended cyclic prefix includes six OFDM symbols. A subcarrier in an OFDM symbol is referred to as a resource element (resource element, RE). Therefore, one RB includes 84 or 72 REs. In a subframe, a pair of RBs in two timeslots is referred to as a resource block pair (RB pair). During uplink data transmission, among seven OFDM symbols of a timeslot, a fourth OFDM symbol is an uplink demodulation pilot, and other symbols may be used to carry data, as shown in FIG. 1.

In a current 3GPP protocol, although four uplink transmit antennas are defined, and four power amplifiers (Power Amplifier, PA) for simultaneously transmitting sounding reference signals (sounding reference signal, SRS) are supported, actually, no terminal with two or more PAs is in commercial use. In comparison with uplink data transmission in LTE, in a new generation transmission protocol, UE supports more uplink transmit antennas, for example, supports six or even eight uplink transmit antennas. However, due to a cost limitation, a quantity of PAs actually supported by the UE is usually less than or equal to a quantity of transmit antennas of the UE.

In addition, different panels (panel) are also supported for uplink transmission of the UE. There is a relatively strong correlation between a plurality of antennas in a same panel, but channel transmission features and blocking probabilities corresponding to antennas in different panels are different. When the UE has a plurality of antennas, and the antennas are located in different panels, dynamic switching between antenna port groups cannot be implemented according to different transmission requirements in the prior art, and further, channel quality measurement cannot be performed quickly and effectively within an entire system bandwidth. For example, in a time division duplex (time division duplex, TDD) system, UE transmits an SRS to a base station so that uplink or downlink channel quality information is obtained. If the UE has P (P≥1) transmit antennas but has only Q (Q<P) PAs, because the UE does not support SRS transmission by the P antennas based on alternate switching between Q antenna port groups, the base station cannot quickly and effectively obtain quality information of channels between all transmit antennas of the UE and receive antennas of the base station and channels between all receive antennas of the UE and transmit antennas of the base station. Therefore, there is a relatively great performance loss.

SUMMARY

This application provides a method and an apparatus for transmitting a reference signal, and a method and an apparatus for receiving a reference signal, so that UE traverses an entire system bandwidth on all antennas as quickly as possible and that accuracy of uplink reference signal transmission is improved.

According to a first aspect, this application provides a method for transmitting a reference signal. The method includes: receiving, by a second network device, first group information of reference signal ports from a first network device, where the first group information includes information about N groups of reference signal ports, N is a positive integer, and N≥1; determining, by the second network device, a $k^{th}$ group of reference signal antenna port in the N groups of reference signal ports, where k is a positive integer, and N≥k≥1; and transmitting, by the second network device, a reference signal on the $k^{th}$ group of reference signal antenna port.

In the method provided by this aspect, the second network device determines, in the N groups of reference signal port according to the received group information of reference signal port from the first network device, the $k^{th}$ group of antenna ports for transmitting the reference signal, and then transmits the reference signal by using the $k^{th}$ group of antenna port. In this way, quick switching between the reference signal antenna port of the second network device is implemented, and the reference signal is transmitted by using a port after the switching. For the reference signal port after the switching, channel transmission features and blocking probabilities corresponding to different antenna panel structures and a transmission requirement of a current transmission scheme are considered. Therefore, effective adaptive uplink data transmission can be performed, the transmitted reference signal can traverse an entire to-be-measured bandwidth as quickly as possible, and accuracy of channel measurement and efficiency of uplink data transmission are improved.

With reference to the first aspect, in an implementation, the determining, by the second network device, a $k^{th}$ group of reference signal antenna port in the N groups of reference signal ports according to the information of the N groups of reference signal ports includes: determining, by the second network device, the $k^{th}$ group of reference signal antenna port according to at least one of an occasion for transmitting the reference signal, the group quantity N of the reference signal port, and a quantity K of times that the reference signal is transmitted.

With reference to the first aspect, in an implementation, the determining the $k^{th}$ group of reference signal antenna port includes: according to the following relation:

$$k(n) = \begin{cases} (n + \lfloor n/N \rfloor + \beta \cdot \lfloor n/K \rfloor) \bmod N & \text{when } K \text{ is an even number} \\ n \bmod N & \text{when } K \text{ is an odd number} \end{cases},$$

determining the antenna port group number k for the reference signal, where $$\beta = \begin{cases} 1 & \text{when } K \bmod 2N = 0 \\ 0 & \text{except when } K \bmod 2N = 0 \end{cases},$$

n represents the occasion for transmitting the reference signal, k(n) represents the antenna port group number k determined for the reference signal at the time n, K represents the quantity of times that the reference signal is transmitted, and K≥1.

With reference to the first aspect, in an implementation, before the receiving, by a second network device, first group information of reference signal ports from a first network device, the method further includes: reporting, by the second network device, second group information to the first network device, where the second group information includes at least one of antenna panel information, reference signal port information, and reference signal port group information of the second network device.

In this implementation, the second network device reports the second group information to the first network device, so that when the first network device configures the group information of reference signal port, the first network device can perform group according to a requirement of the second network device such as the transmission scheme, a reference signal port quantity, port numbers, or the like and implement adaptive group of uplink antenna ports and corresponding data transmission. In this way, the following is avoided: Because P antennas of the second network device do not support reference signal transmission based on switching between Q antenna port groups, the first network device cannot obtain quality information of channels between all transmit antennas of the UE and receive antennas of the base station and channels between all receive antennas of the UE and transmit antennas of the base station, and further, a relatively great performance loss is caused.

With reference to the first aspect, in an implementation, the receiving, by a second network device, first group information of reference signal port from a first network device includes: receiving, by the second network device, signaling from the first network device, where the signaling indicates the first group information of the reference signal port; and the signaling includes at least one of higher layer signaling, layer 1 signaling, and layer 2 signaling.

According to a second aspect, this application further provides a method for receiving a reference signal, where the method is applied to a first network device, for example, a base station. The method includes: transmitting, by a first network device, first group information of reference signal port to a second network device, where the first group information includes information about N groups of reference signal port, N is a positive integer, and N≥1; and receiving, by the first network device, a reference signal from the second network device, where the reference signal is a reference signal corresponding to a $k^{th}$ group of reference signal ports in the N groups of reference signal port, k is a positive integer, and N≥k≥1.

With reference to the second aspect, in an implementation, the receiving, by the first network device, a reference signal corresponding to a determined $k^{th}$ group of reference signal port in the N groups of reference signal port and transmitted by the second network device includes: receiving, by the first network device, the reference signal corresponding to the $k^{th}$ group of reference signal port, where the $k^{th}$ group of reference signal ports is determined by the second network device according to at least one of an occasion for transmitting the reference signal, the group quantity N of the reference signal port, and a quantity K of times that the reference signal is transmitted.

With reference to the second aspect, in an implementation, the receiving, by the first network device, the reference signal corresponding to the $k^{th}$ group of reference signal port includes: according to the first relation:

$$k(n) = \begin{cases} (n + \lfloor n/N \rfloor + \beta \cdot \lfloor n/K \rfloor) \bmod N & \text{when } K \text{ is an even number} \\ n \bmod N & \text{when } K \text{ is an odd number} \end{cases},$$

receiving the reference signal corresponding to the determined $k^{th}$ group of reference signal port, where $$\beta = \begin{cases} 1 & \text{when } K \bmod 2N = 0 \\ 0 & \text{except when } K \bmod 2N = 0 \end{cases},$$

n represents the occasion for transmitting the reference signal, k(n) represents the antenna port group number k determined for the reference signal at the time n, K represents the quantity of times that the reference signal is transmitted, and K≥1.

With reference to the second aspect, in an implementation, before the transmitting, by a first network device, first group information of reference signal port to a second network device, the method further includes: receiving, by the first network device, second group information from the second network device, where the second group information includes at least one of antenna panel information, reference signal port information, and reference signal port group information of the second network device; and determining, by the first network device, the first group information of the reference signal port according to the second group information.

With reference to the second aspect, in an implementation, the transmitting, by a first network device, first group information of reference signal port to a second network device includes: transmitting, by the first network device, the first group information to the second network device by using signaling, where the signaling includes at least one of higher layer signaling, layer 1 signaling, and layer 2 signaling.

In the method provided by this aspect, the first network device base station can configure corresponding reference signal port group information according to a transmission requirement of the second network device UE. Therefore, the second network device UE can switch between the ports according to an indication of the port group information, flexible adaptive group of uplink reference signal antenna port of the UE and corresponding data transmission are implemented, all antennas of the UE can quickly traverse an entire bandwidth, and accuracy and precision of channel measurement are improved.

According to a third aspect, this application provides a method for transmitting a signal. The method includes: receiving, by a terminal device, a precoding matrix index determined by a base station in a first index set, where the precoding matrix index is used to determine a precoding matrix used for transmitting data by the terminal device, each index in the first index set corresponds to a precoding matrix in a first precoding matrix set, the first precoding matrix set is a proper subset of a second precoding matrix set, and any precoding matrix index value in the first index set is less than or equal to a quantity of precoding matrices included in the first precoding matrix set; and transmitting, by the terminal device, the data according to the precoding matrix index.

With reference to the third aspect, in an implementation, before the receiving, by a terminal device, a precoding matrix index determined by a base station in a first index set, the method further includes: receiving, by the terminal device, information of the first precoding matrix set from the base station, where the information of the first precoding matrix set indicates a subset of the second precoding matrix set.

With reference to the third aspect, in an implementation, before the receiving, by a terminal device, a precoding matrix index determined by a base station in a first index set, the method further includes: transmitting, by the terminal device, information of the first precoding matrix set to the base station, where the information of the first precoding matrix set indicates a subset of the second precoding matrix set.

With reference to the third aspect, in an implementation, the receiving, by the terminal device, the information of the first precoding matrix set and/or the precoding matrix index includes: receiving, by the terminal device, signaling from the base station, where the signaling carries at least one of the information of the first precoding matrix set and the precoding matrix index, and the signaling includes at least one of higher layer signaling, layer 1 signaling, and layer 2 signaling.

In the method provided by this aspect, the base station transmits the configured precoding matrix index to the terminal device UE, so that the UE can determine, according to the precoding matrix index, the precoding matrix used when the UE transmits the data. Because the matrix index is selected from the first precoding matrix set, and the first precoding matrix set is a proper subset of the second precoding matrix set, the UE can be quickly instructed to use the precoding matrix to transmit the data. Moreover, because a value of the index is limited within a subset of the second precoding matrix set of the UE, required DCI indication signaling overheads are reduced.

In addition, the UE reports the information of the first precoding matrix set to the base station, so that the base station can select an appropriate precoding matrix index for the UE according to the precoding matrix set recommended by the UE. Therefore, the precoding matrix corresponding to the precoding matrix index can adapt to a plurality of possible antenna panel structures on a UE side, optimal precoding matrix configurations in different antenna panel patterns are implemented, and performance of data transmission is improved. Optionally, the UE can recommend the information of the first precoding matrix set to the base station according to an adaptive transmission requirement, for example, different transmission scheme, and a quantity of ports and port numbers of the UE.

According to a fourth aspect, an embodiment of this application further provides a method for receiving a signal. The method includes: determining, by a base station, a precoding matrix index in a first index set, where the precoding matrix index is used to determine a precoding matrix used for transmitting data by a terminal device, each index in the first index set corresponds to a precoding matrix in a first precoding matrix set, the first precoding matrix set is a proper subset of a second precoding matrix set, and any precoding matrix index value in the first index set is less than or equal to a quantity of precoding matrices included in the first precoding matrix set; transmitting, by the base station, the precoding matrix index to the terminal device; and receiving, by the base station, the data transmitted by the terminal device according to the precoding matrix index.

With reference to the fourth aspect, in an implementation, before the determining, by a base station, a precoding matrix index in a first index set, the method further includes: configuring, by the base station, information of the first precoding matrix set, where the information of the first precoding matrix set indicates a subset of the second precoding matrix set; and transmitting, by the base station, the information of the first precoding matrix set to the terminal device.

With reference to the fourth aspect, in an implementation, the determining, by a base station, a precoding matrix index in a first index set includes: receiving, by the base station, information of the first precoding matrix set transmitted by the terminal device; determining, by the base station, a subset of the second precoding matrix set according to the information of the first precoding matrix set; and determining, by the base station, the precoding matrix index according to the subset of the second precoding matrix set.

With reference to the fourth aspect, in an implementation, the transmitting, by the base station, the information of the first precoding matrix set and/or the precoding matrix index to the terminal device includes: transmitting, by the base station, signaling, where the signaling carries at least one of the information of the first precoding matrix set and the precoding matrix index, and the signaling includes at least one of higher layer signaling, layer 1 signaling, and layer 2 signaling.

According to a fifth aspect, this application provides an apparatus for transmitting a reference signal. The apparatus may be disposed in a second network device, for example, a terminal device. The apparatus includes units configured to perform the steps in the first aspect and each implementation of the first aspect.

According to a sixth aspect, this application provides an apparatus for receiving a reference signal. The apparatus may be disposed in a first network device, for example, a base station. The apparatus includes units configured to perform the steps in the second aspect and each implementation of the second aspect.

According to a seventh aspect, this application provides an apparatus for transmitting a signal. The apparatus may be disposed in a second network device, for example, a terminal device. The apparatus includes units configured to perform the steps in the third aspect and each implementation of the third aspect.

According to an eighth aspect, this application provides an apparatus for receiving a signal. The apparatus may be disposed in a first network device, for example, a base station. The apparatus includes units configured to perform the steps in the fourth aspect and each implementation of the fourth aspect.

According to a ninth aspect, this application provides a system. The system includes a first network device and a second network device. The first network device may be a base station. The second network device may be a terminal device, for example, UE. Specifically, the first network device includes a transceiver, a processor, and a memory. The first network device is configured to implement the method for transmitting a reference signal in the second aspect and each implementation of the second aspect, and configured to implement the method for receiving a signal in the fourth aspect and each implementation of the fourth aspect. The second network device includes a transceiver, a processor, and a memory. The second network device is configured to implement the method for receiving a reference signal in the first aspect and each implementation of the first aspect, and configured to implement the method for receiving a signal in the third aspect and each implementation of the third aspect.

According to a tenth aspect, this application further provides a computer storage medium. The computer storage medium may store a program. When the program is executed, some or all steps included in the embodiments of the method for transmitting a reference signal and the method for receiving a reference signal, as well as the method for receiving a signal and the method for transmitting a signal according to this application may be implemented.

BRIEF DESCRIPTION OF DRAWINGS

To describe the technical solutions in this application more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

Figure 1:
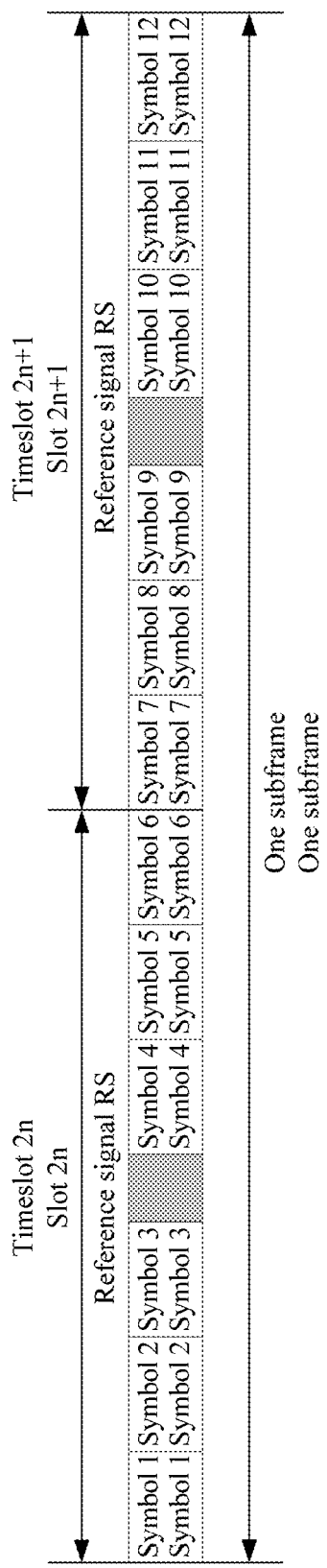
FIG. 1 is a schematic structural diagram of an uplink subframe for a PUSCH according to an embodiment of this application.

The following clearly and completely describes the technical solutions in the embodiments of this application with reference to the accompanying drawings in the embodiments of this application.

The embodiments of this application are applied to a communications system including at least one first network device used as a transmitting device and at least one second network device used as a receiving device. The transmitting device and the receiving device may be any transmit end device and receive end device for performing data transmission in a wireless mode. The transmitting device and the receiving device may be any device having wireless transmitting and receiving functions, including but not limited to a base station (NodeB), an evolved NodeB (eNodeB), a base station in a fifth generation (the fifth generation, 5G) communications system, a base station or a network device in a future communications system, an access point in a Wi-Fi system, a wireless relay node, a wireless backhaul node, user equipment (user equipment, UE), and the like.

The UE may also be referred to as a terminal, a mobile station (mobile station, MS), a mobile terminal (mobile terminal, MT), a remote device (remote terminal, RT), an access terminal (access terminal, AT), a user agent (user agent, UA), or the like. The UE may communicate with one or a plurality of core networks through a radio access network (radio access network, RAN), or may access a distributed network in a self-organizing or unauthorized mode. The UE may further communicate with a wireless network in another mode, or the UE may directly perform wireless communication with another UE. This is not limited in this embodiment of this application.

A method for transmitting a reference signal or a sounding reference signal (Sounding Reference Signal, SRS) according to the embodiments of this application may be applicable to downlink data transmission, or may be applicable to uplink data transmission. For downlink data transmission, a transmitting device is a base station, and a corresponding receiving device is UE. For uplink data transmission, a transmitting device is UE, and a corresponding receiving device is a base station. For D2D data transmission, a transmitting device is UE, and a corresponding receiving device is also UE. This is not limited in this embodiment of this application.

An SRS port group switching method provided by the embodiments of this application may be applied to various communications systems, for example, an LTE system, and WCDMA, 4G, 4.5G, and 5G systems. Application scenarios are not limited in this application.

An embodiment of this application provides a method for adaptive antenna grouping and dynamic antenna switching based on the grouping. Considering that channel transmission features and blocking probabilities corresponding to different panels are different, but different transmission schemes have different reference signal transmission and measurement requirements, for example, a transmission scheme of transmit diversity requires high reliability, a plurality of antennas located in different panels may be grouped into one group if possible during grouping of SRS ports, thereby overcoming interruption of a user's uplink signal transmission caused by random blocking in uplink signal transmission. For a closed-loop transmission mode, higher channel quality measurement precision is required. During grouping of SRS ports, a plurality of antennas located in a same panel may be grouped into one group if possible, so that accurate channel quality measurement can be implemented for the plurality of antennas in the same panel. Especially for tracking some channel quality information that changes quickly, for example, tracking phase rotation information between two polarization directions, a measurement result can be obtained more quickly and accurately only when measurement is performed based on the plurality of antennas located in the same antenna panel.

Specifically, using uplink reference signal transmission as an example, in this embodiment, a first network device and a second network device are included. The first network device is a base station, and the second network device is UE. The method for transmitting a reference signal includes the following steps.

Figure 2:
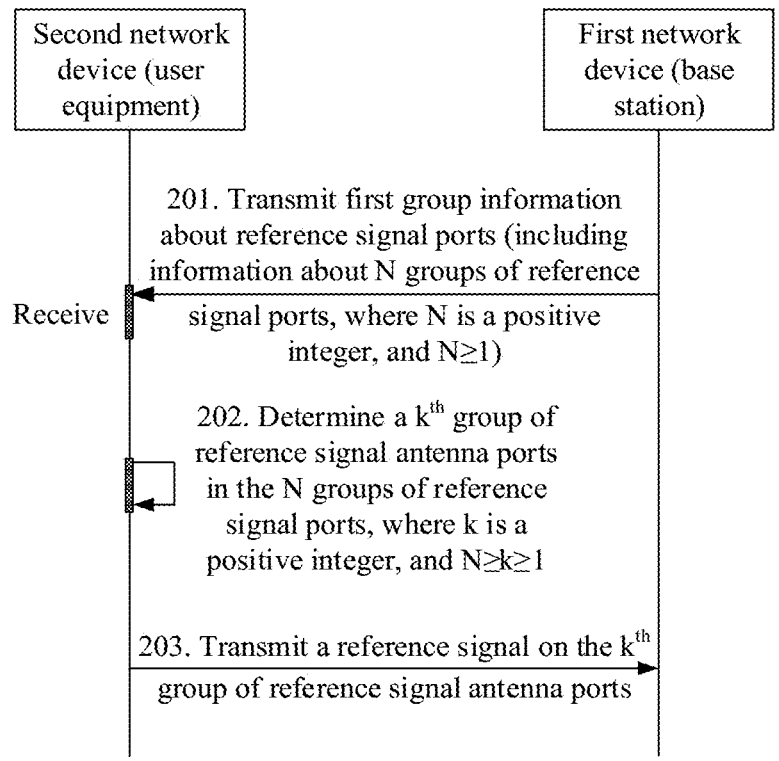
FIG. 2 is a flowchart of a method for transmitting a reference signal according to an embodiment of this application.

Referring to FIG. 2, FIG. 2 is a schematic flowchart of a method for transmitting a reference signal.

Step 201: A base station transmits first group information of a reference signal port to UE, where the first group information includes information about N groups of a reference signal port, N is a positive integer, and N≥1. That is, the UE receives the first group information of the reference signal port from the base station.

N represents a quantity of port groups included in the UE. When N is equal to 1, it indicates that the first group information includes information about one group of a reference signal port. When N is greater than 1, it indicates that the first group information includes group information of two or more groups of reference signal ports.

Information of each group of reference signal ports includes at least one of a reference signal port quantity corresponding to the port group and reference signal port numbers, or other information. The reference signal port quantity included in each group of reference signal ports is greater than or equal to 1, and reference signal port quantities included in different port groups may be the same or different. For example, all reference signal ports of the UE are grouped into three groups: a first group, a second group, and a third group. Each group includes at least one antenna port. For example, the first group includes two reference signal port numbers, and the second group and the third group include three port numbers respectively. In the reference signal port group information configured by the base station at this time, port quantities in the second group and the third group are the same. Optionally, during group next time, all port numbers included in any two groups may be different. This is not limited herein.

That the UE receives the first group information of the reference signal port from the base station specifically includes: the UE receives signaling from the base station, where the signaling indicates the first group information of the reference signal port. Further, the signaling includes at least one of higher layer signaling, layer 1 signaling, and layer 2 signaling. The higher layer signaling may be radio resource control (Radio Resource Control, RRC) signaling or radio link control (Radio Link Control, RLC) signaling.

The layer 1 signaling may be physical layer signaling (such as downlink control information DCI). The layer 2 signaling may be MAC CE signaling, or the like. Specifically, which of the foregoing signaling is used by the base station to transmit the reference signal port group information may be determined according to a requirement and an application scenario, and is not limited in this embodiment.

Step 202: The UE determines a $k^{th}$ group of a reference signal antenna port in the N groups of reference signal ports, where k is a positive integer, and N≥k≥1.

Step 203: The UE transmits a reference signal on the $k^{th}$ group of reference signal antenna port.

When N is equal to 1, the UE determines the first group of reference signal antenna port, and transmits the reference signal to the base station by using the first group of reference signal antenna port. In this case, k is equal to N, and the UE transmits the reference signal by using the group of reference signal ports configured by the base station. When N is greater than 1, the UE selects, from the information of the N groups of reference signal ports, the antenna port group number k for transmitting the reference signal, and N≥k≥1; and the UE transmits the reference signal to the base station by using the $k^{th}$ group of antenna ports.

Correspondingly, the base station receives the reference signal from the UE, and the reference signal is a reference signal corresponding to the $k^{th}$ group of reference signal ports in the N groups of reference signal ports. The corresponding reference signal is the reference signal transmitted by the UE by using the $k^{th}$ group of reference signal antenna port.

In addition, if the $k^{th}$ group of antenna ports determined by the UE is different from a port on which the UE currently transmits the reference signal, at a time n, the UE first determines and switches to the $k^{th}$ group of reference signal antenna port, and then transmits the reference signal.

Optionally, that the UE determines a $k^{th}$ group of reference signal antenna port in the N groups of reference signal port according to the information of the N groups of reference signal ports in step 202 includes: the UE determines the $k^{th}$ group of reference signal antenna port according to at least one of the time n for transmitting the reference signal, the group quantity N of the reference signal port, and a quantity K of times that the reference signal is transmitted.

Specifically, that the UE determines the $k^{th}$ group of reference signal antenna port according to the occasion for transmitting the reference signal, the group quantity N of the reference signal port, and a quantity K of times that the reference signal is transmitted includes:

According to different scenarios and requirements, a function of selecting or switching an antenna port for transmitting an uplink signal by the UE may be adaptively configured to two states: "enabled" or "disabled".

When the function of selecting an antenna port of the UE is in the enabled state, a user may select an antenna port for transmitting an uplink signal, and a port number for transmitting a reference signal at a time may be determined according to whether reference signal transmission in a frequency hopping (hopping) is allowed.

Specifically, according to the following relation:

$$k(n) = \begin{cases} (n + \lfloor n/N \rfloor + \beta \cdot \lfloor n/K \rfloor) \bmod N & \text{when } K \text{ is an even number} \\ n \bmod N & \text{when } K \text{ is an odd number} \end{cases},$$

the reference signal corresponding to the determined $k^{th}$ group of reference signal ports may be received, where $$\beta = \begin{cases} 1 & \text{when } K \bmod 2N = 0 \\ 0 & \text{except when } K \bmod 2N = 0 \end{cases},$$

n represents the occasion for transmitting the reference signal, k(n) represents the antenna port group number k determined for the reference signal at the time n, K represents the quantity of times that the reference signal is transmitted, K≥1, and mod represents a modulo operation.

The following provides two manners of determining the antenna port group number k for the UE to transmit the reference signal at the time n.

A manner of determining the antenna port group number k for transmitting the uplink signal at the time n includes: when the UE is in a frequency hopping state, and N is equal to 2, that is, the UE transmits the reference signal by using two groups of ports, according to the following first relation:

$$k(n) = \begin{cases} (n + \lfloor n/2 \rfloor + \beta \cdot \lfloor n/K \rfloor) \bmod 2 & \text{when } K \text{ is an even number} \\ n \bmod 2 & \text{when } K \text{ is an odd number} \end{cases},$$

the antenna port group number k for the reference signal is determined,
where $$\beta = \begin{cases} 1 & \text{when } K \bmod 4 = 0 \\ 0 & \text{except when } K \bmod 4 = 0 \end{cases},$$

n represents the occasion for transmitting the reference signal, k(n) represents the antenna port group number k determined for the reference signal at the time n, and K represents the quantity of times that the reference signal is transmitted. Specifically, herein K represents the quantity of times that the reference signal is transmitted and which is required for the UE to traverse an entire to-be measured bandwidth in a channel measurement process. K is a positive integer greater than or equal to 1.

Optionally, the occasion for transmitting the reference signal may be any one of a subframe, a timeslot, a minimum timeslot, and an OFDM symbol, that is, the time n may be a subframe n, or a timeslot n, or a minimum timeslot n, or an OFDM symbol n. In addition, the time may be any time unit other than those defined above. This is not limited herein.

For example, if n represents a subframe, k(n) may represent a corresponding transmit antenna port number when a reference signal is transmitted in the subframe n. The UE transmits the reference signal for K times by using different reference signal transmit antenna ports in a channel measurement process, and can further traverse the entire to-be-measured bandwidth. This further improves precision of channel quality measurement.

Another manner of determining k includes: likewise, when the function of selecting an antenna port of the UE is in the enabled state, a user selects an antenna port group. An index of an antenna port group for transmitting a reference signal at a time n may be represented by k(n). In addition, assuming that a frequency hopping state of the UE is enabled, if all reference signal transmit antenna ports of the UE are grouped into four groups (N=4), when a reference signal is transmitted by using the four groups of antenna ports, according to the following second relation:

$$k(n) = \begin{cases} (n + \lfloor n/4 \rfloor + \beta \cdot \lfloor n/K \rfloor) \bmod 4 & \text{when } K \text{ is an even number} \\ n \bmod 4 & \text{when } K \text{ is an odd number} \end{cases},$$

the antenna port group number k for the reference signal may be determined,
where $$\beta = \begin{cases} 1 & \text{when } K \bmod 8 = 0 \\ 0 & \text{excep when } K \bmod 8 = 0 \end{cases},$$

n represents the occasion for transmitting the reference signal, k(n) represents the antenna port group number k determined for the reference signal at the time n, and K represents the quantity of times that the reference signal is transmitted. Specifically, herein K represents the quantity of times that the reference signal is transmitted and which is required for the UE to traverse an entire to-be measured bandwidth in a channel measurement process. K is a positive integer greater than or equal to 1.

It should be noted that, in this application, other relations or predefined manners may also be used to determine the antenna port group number k for the UE to transmit the reference signal at the time n. This is not limited in this embodiment Optionally, in the foregoing step 201, before the UE receives the first group information of reference signal that is transmitted by the base station, the method further includes: the UE reports second group information to the base station, so that the base station can determine the first group information according to the second group information. The second group information includes at least one of antenna panel information, reference signal port information, and reference signal port group information of the UE.

Figure 8:
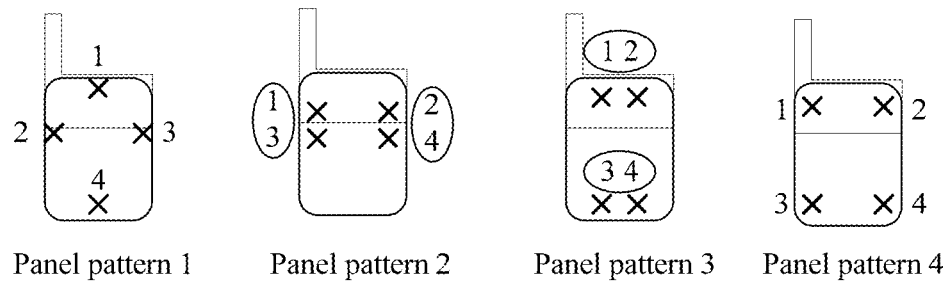
FIG. 8 is a schematic structural diagram of different antenna panel patterns according to an embodiment of this application.

The antenna panel information includes at least one of a distribution structure of all antennas of the UE and a panel pattern (panel pattern), or other information. Herein the panel pattern information further includes at least one of a quantity of panels and a distribution pattern of P (P≥1) panels, or other information. The distribution pattern information of the panels may be a plurality of panel distribution patterns predefined on the base station and the user side. For example, FIG. 8 is a schematic structural diagram of four antenna panel patterns, where X represents a pair of reference signal antenna ports in two polarization directions, different reference signal antenna ports are distributed in different positions of the terminal device, and different antenna port panel patterns are generated.

The reference signal port information includes the quantity of reference signal ports of the UE, a port number of each reference signal port, and other information. The reference signal port group information includes group information that is generated after group of all reference signal antenna ports and is recommended by the UE. For example, all antenna ports are grouped, according to odd and even numbers in numbering, into two groups to generate group information. Alternatively, all antenna ports are grouped into P groups according to P antenna panels, where antenna ports located in a panel belong to a group.

Optionally, the reference signal port group information in the second group information may be the same as or different from the first group information of the reference signal ports that is transmitted by the base station in step 201. After the base station receives the second group information of the UE, the base station may determine, according to an uplink transmission scheme configured by the base station for the UE, whether to use antenna port group information same as the second group information.

In addition, the second group information reported by the UE to the base station may further include transmission scheme information of the UE or a channel quality result previously obtained by the UE through measurement, where the channel quality result includes uplink channel quality measurement information such as a CQI. The base station performs reception the group information of reference signal port according to different transmission schemes required by the UE, for example, uplink transmit diversity, an open-loop transmission mode, and a closed-loop transmission mode, and determines, according to the transmission scheme, the reference signal port group information to be delivered to the UE.

In the method provided by this embodiment, the user equipment UE determines, in the N groups of reference signal ports according to the received group information of reference signal ports from the base station, the $k^{th}$ group of antenna ports for transmitting the reference signal, and then transmits the reference signal by using the $k^{th}$ group of antenna ports. In this way, quick switching between the reference signal antenna ports of the UE is implemented, and the reference signal is transmitted by using a port after the switching. For the reference signal port after the switching, channel transmission features and blocking probabilities corresponding to different antenna panel structures and a transmission requirement of a current transmission scheme are considered. Therefore, effective adaptive uplink data transmission can be performed, the transmitted reference signal can traverse the entire to-be-measured bandwidth as quickly as possible, and accuracy of channel measurement and efficiency of uplink data transmission are improved.

In a specific embodiment, the base station receives the second group information reported by the UE, and the second group information includes a quantity of ports and port numbers used when the UE transmits an uplink signal. For example, the UE has eight antenna ports in total, and the eight antenna ports are numbered from 0 to 7 respectively. After receiving the second group information reported by the UE, the base station groups the eight ports according to the quantity of ports and port numbers of the UE and the current transmission scheme, generates the first group information, and delivers the first group information to the UE. The UE receives the first group information, and determines, according to an indication of the first group information, the antenna port group number k for transmitting the reference signal.

Figure 3:
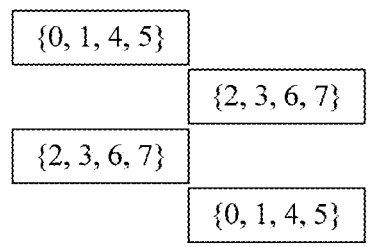
FIG. 3 is a schematic diagram of an indication of group information of reference signal ports according to an embodiment of this application.

As shown in FIG. 3, an indication of the first group information includes: in the first group information, port numbers 0, 1, 4, and 5 are grouped into one group, and port numbers 2, 3, 6, and 7 are grouped into one group. After receiving the port group information, the UE determines, according to the indication of the port group information, the antenna port group number k for transmitting the reference signal at the time n. Further, according to the indication of the reference signal port group information, the UE determines the port group number k used every time the reference signal is transmitted, where each port group includes at least one antenna port. For example, in a channel measurement process, a reference signal is transmitted for four times, and the following four reference signal port groups are used for transmission at the four times respectively, where port numbers corresponding to each reference signal port group are: {0, 1, 4, 5}, {2, 3, 6, 7}, {2, 3, 6, 7}, and {0, 1, 2, 3}.

Figure 4:
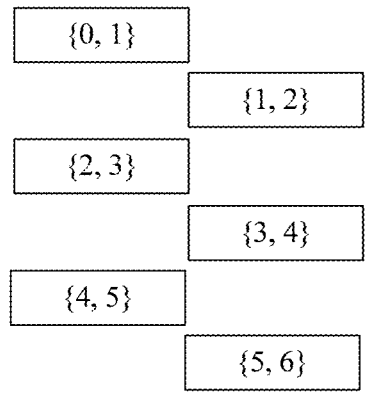
FIG. 4 is a schematic diagram of another indication of group information of reference signal ports according to an embodiment of this application.

As shown in FIG. 4, FIG. 4 is an implementation of another indication of the first group information. The implementation specifically includes: the UE transmits the reference signal for six times according to the received reference signal port group information, and the reference signal is transmitted every time on a port group including two ports. Further, the UE determines that port numbers used when the reference signal is transmitted every time in the six times are {0, 1}, {1, 2}, {2, 3}, {3, 4}, {4, 5}, and {5, 6} respectively, and then the UE performs switching according to the grouped antenna port numbers and transmits the reference signal sequentially.

The antenna port group information delivered by the base station to the UE may be transmitted by using signaling. Further, the signaling includes higher layer signaling, for example, RRC signaling or RLC signaling, or physical layer signaling, for example, DCI or a MAC CE.

Further, in the foregoing embodiment, the quantity K of times that the reference signal is transmitted on a UE side is the quantity of times that the reference signal is transmitted and which is required for the UE to traverse the entire to-be-measured bandwidth in a channel measurement process. Assuming that a frequency hopping function is enabled for the reference signal, but the quantity of times that the reference signal is transmitted and which is required for the UE to measure and traverse the entire to-be measured bandwidth may be determined according to a cell-specific and/or user-specific reference signal bandwidth configuration parameter for the user. Specifically, for a reference signal bandwidth configuration parameter, refer to the following Table 1 to Table 4. For example, the reference signal may be a sounding reference signal SRS, or the like.

TABLE 1

Uplink bandwidth $6 \leq N_{RB}^{UL} \leq 40$, and values of $m_{SRS, b}$ and $N_b$ (b = 0, 1, 2, 3)

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 36 | 1 | 12 | 3 | 4 | 3 | 4 | 1 |
| 1 | | | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

Uplink bandwidth $40 < N_{RB}^{UL} \leq 60$, and values of $M_{SRS, b}$ and $N_b$ (b = 0, 1, 2, 3)

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 48 | 1 | 24 | 2 | 12 | 2 | 4 | 3 |
| 1 | 48 | 1 | 16 | 3 | 8 | 2 | 4 | 2 |

TABLE 2-continued

Uplink bandwidth $40 < N_{RB}^{UL} \leq 60$,
and values of $M_{SRS,b}$ and $N_b$ (b = 0, 1, 2, 3)

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

Uplink bandwidth $60 < N_{RB}^{UL} \leq 80$,
and values of $m_{SRS,b}$ and $N_b$ (b = 0, 1, 2, 3)

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

Uplink bandwidth $80 < N_{RB}^{UL} \leq 110$,
and values of $m_{SRS,b}$ and $N_b$ (b = 0, 1, 2, 3)

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

The foregoing Table 1 to Table 4 show values of $m_{SRS,b}$ and $N_b$ in cases of different uplink bandwidths and different SRS bandwidth configurations, where $m_{SRS,b}$ represents a frequency domain bandwidth when the SRS is transmitted at a time. Every time a bandwidth for transmitting the SRS by the UE is less than the to-be-measured bandwidth, SRS frequency hopping (hopping) needs to be performed. Generally, it is specified that SRS frequency hopping may be configured by using a higher layer parameter SRS frequency hopping bandwidth (SRS hopping bandwidth), and a range of parameter values are generally $b_{hop} \in \{0, 1, 2, 3\}$. When $b_{hop} < B_{SRS}$, the UE needs to perform SRS frequency hopping, that is, perform frequency hopping only when an SRS transmission bandwidth of the UE is less than a frequency hopping bandwidth. This means that a tree structure node indicated by a UE-specific (specific) SRS bandwidth has a parent node whose bandwidth is a frequency hopping bandwidth in a tree, and the UE performs SRS frequency hopping only when the parent node includes a plurality of child nodes.

Figure 5:
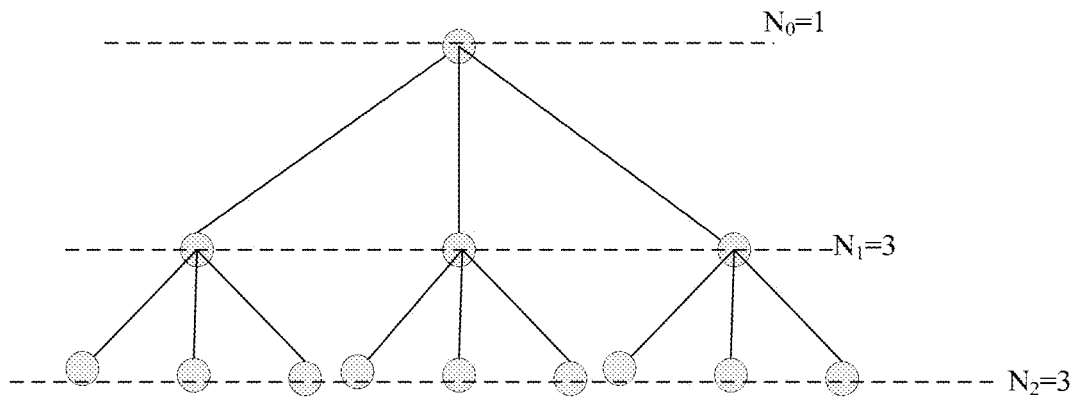
FIG. 5 is a schematic diagram for determining a quantity K of times that a reference signal is transmitted according to an embodiment of this application.

For example, referring to FIG. 5, in Table 1, assuming $C_{SRS}=0$ and $b_{hop}=0$, the bandwidth that needs to be measured is 36 PRBs; if $B_{SRS}=2$, the bandwidth for transmitting the SRS every time is four PRBs, and nine times of transmission are required for traversing the entire to-be-measured bandwidth. In Table 1 to Table 3, $N_b$ represents a quantity of level-1 nodes. Using $C_{SRS}=0$ in Table 1 as an example, $N_0=1$ indicates that one node exists on this level, and $N_1=3$ indicates that three nodes exist on this level. $N_2$ and $N_3$ may be deduced in the same way. FIG. 1 shows a diagram of a tree structure when $N_0=1$, $N_1=3$, and $N_2=3$. When $b_{hop}=0$ and $B_{SRS}=2$, nine times of SRS transmission are required for traversing a to-be-measured bandwidth corresponding to $b_{hop}=0$.

In the method based on antenna port group and provided by this embodiment, the first network device base station can configure corresponding reference signal port group information according to a transmission requirement of the second network device UE. Therefore, according to an indication of the port group information, the second network device UE can switch between the ports for transmitting the uplink reference signal, flexible adaptive group of uplink reference signal antenna ports of the UE and corresponding data transmission are implemented, all antennas of the UE can quickly traverse the entire bandwidth, and accuracy and precision of channel measurement are improved.

Figure 6:
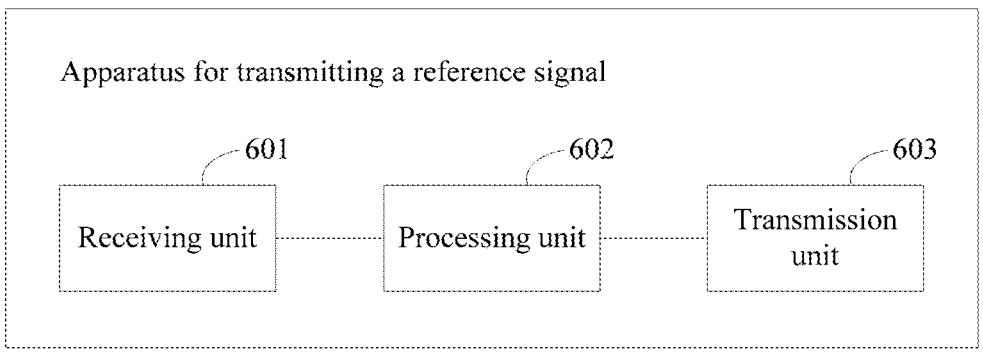
FIG. 6 is a schematic structural diagram of an apparatus for transmitting a reference signal according to an embodiment of this application.

Another embodiment of this application further provides an apparatus for transmitting a reference signal. The apparatus is configured to implement the method for transmitting a reference signal in the foregoing embodiment. The apparatus is disposed in a second network device, and the second network device includes a terminal device. As shown in FIG. 6, the apparatus for transmitting a reference signal includes a receiving unit 601, a processing unit 602, and a transmission unit 603. In addition, the apparatus may further include other functional units or modules such as a storage unit.

The receiving unit 601 is configured to receive first group information of reference signal ports from a first network device, where the first group information includes information about N groups of reference signal ports, N is a positive integer, and N≥1.

The processing unit 602 is configured to determine a $k^{th}$ group of reference signal antenna port in the N groups of reference signal ports, where k is a positive integer, and N≥k≥1.

The transmission unit 603 is configured to transmit a reference signal on the $k^{th}$ group of reference signal antenna port.

Optionally, the processing unit 602 is specifically configured to determine the $k^{th}$ group of reference signal antenna port according to at least one of an occasion for transmitting the reference signal, the group quantity N of the reference signal port, and a quantity K of times that the reference signal is transmitted.

Optionally, the processing unit 602 is further configured to: according to the following relation:

$$k(n) = \begin{cases} (n + \lfloor n/N \rfloor + \beta \cdot \lfloor n/K \rfloor) \bmod N & \text{when } K \text{ is an even number} \\ n \bmod N & \text{when } K \text{ is an odd number} \end{cases},$$

determine the antenna port group number k for the reference signal, where $$\beta = \begin{cases} 1 & \text{when } K \bmod 2N = 0 \\ 0 & \text{excep when } K \bmod 2N = 0 \end{cases},$$

n represents the occasion for transmitting the reference signal, k(n) represents the antenna port group number k determined for the reference signal at the time n, K represents the quantity of times that the reference signal is transmitted, and K≥1;

when N=2, according to the following first relation:

$$k(n) = \begin{cases} (n + \lfloor n/2 \rfloor + \beta \cdot \lfloor n/K \rfloor) \bmod 2 & \text{when } K \text{ is an even number} \\ n \bmod 2 & \text{when } K \text{ is an odd number} \end{cases},$$

determine the antenna port group number k for the reference signal; or optionally, when N=4, according to the following second relation:

$$k(n) = \begin{cases} (n + \lfloor n/4 \rfloor + \beta \cdot \lfloor n/K \rfloor) \bmod 4 & \text{when } K \text{ is an even number} \\ n \bmod 4 & \text{when } K \text{ is an odd number} \end{cases},$$

determine the antenna port group number k for the reference signal.

Optionally, the transmission unit 603 is further configured to report second group information to the first network device, where the second group information includes at least one of antenna panel information, reference signal port information, and reference signal port group information of the second network device.

Optionally, the receiving unit 601 is further configured to receive signaling from the first network device, where the signaling indicates the first group information of the reference signal ports; and the signaling includes at least one of higher layer signaling, layer 1 signaling, and layer 2 signaling.

Figure 7:
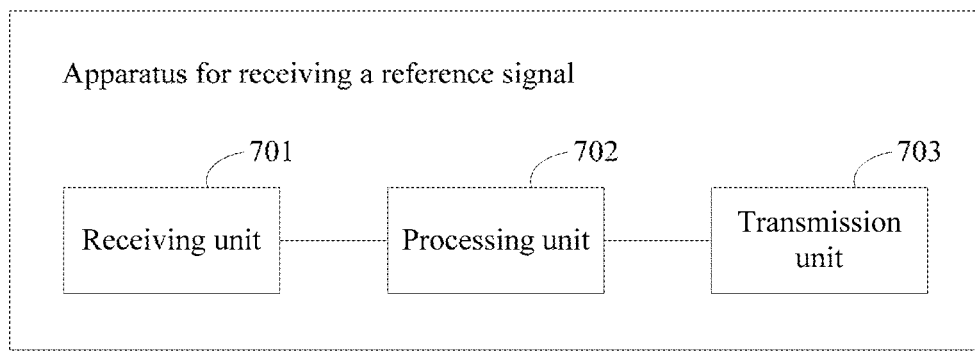
FIG. 7 is a schematic structural diagram of an apparatus for receiving a reference signal according to an embodiment of this application.

In addition, this embodiment further provides an apparatus for receiving a reference signal. The apparatus is configured to implement the method for receiving a reference signal in the foregoing embodiment. The apparatus is disposed in a first network device, for example, a base station. As shown in FIG. 7, the apparatus for receiving a reference signal includes a receiving unit 701, a processing unit 702, and a transmission unit 703. In addition, the apparatus may further include other functional units or modules such as a storage unit.

The transmission unit 703 is configured to transmit first group information of reference signal ports to a second network device, where the first group information includes information about N groups of reference signal ports, N is a positive integer, and N≥1.

The receiving unit 701 is configured to receive a reference signal from the second network device, where the reference signal is a reference signal corresponding to a $k^{th}$ group of reference signal ports in the N groups of reference signal ports, k is a positive integer, and N≥k≥1.

Optionally, the receiving unit 701 is further configured to receive the reference signal corresponding to the $k^{th}$ group of reference signal ports, where the $k^{th}$ group of reference signal ports is determined by the second network device according to at least one of an occasion for transmitting the reference signal, the group quantity N of the reference signal port, and a quantity K of times that the reference signal is transmitted.

Optionally, the receiving unit 701 is further configured to: according to the following relation:

$$k(n) = \begin{cases} (n + \lfloor n/N \rfloor + \beta \cdot \lfloor n/K \rfloor) \bmod N & \text{when } K \text{ is an even number} \\ n \bmod N & \text{when } K \text{ is an odd number} \end{cases},$$

receive the reference signal corresponding to the determined $k^{th}$ group of reference signal ports, where $$\beta = \begin{cases} 1 & \text{when } K \bmod 2N = 0 \\ 0 & \text{except when } K \bmod 2N = 0 \end{cases},$$

n represents the occasion for transmitting the reference signal, k(n) represents the antenna port group number k determined for the reference signal at the time n, K represents the quantity of times that the reference signal is transmitted, and K≥1.

Optionally, the receiving unit 701 is further configured to receive second group information from the second network device, where the second group information includes at least one of antenna panel information, reference signal port information, and reference signal port group information of the second network device.

The processing unit 702 is configured to determine the first group information of the reference signal ports according to the second group information.

Optionally, the transmission unit 703 is further configured to transmit the first group information to the second network device by using signaling, where the signaling includes at least one of higher layer signaling, layer 1 signaling, and layer 2 signaling.

In this embodiment, the second network device determines, in the N groups of reference signal ports according to the received group information of reference signal ports from the first network device, the $k^{th}$ group of antenna ports for transmitting the reference signal, and then transmits the reference signal by using the $k^{th}$ group of antenna ports. In this way, quick switching between the reference signal antenna ports of the second network device is implemented, and the reference signal is transmitted by using a port after the switching. For the reference signal port after the switching, channel transmission features and blocking probabilities corresponding to different antenna panel structures and a transmission requirement of a current transmission scheme are considered. Therefore, effective adaptive uplink data transmission can be performed, the transmitted reference signal can traverse an entire to-be-measured bandwidth as quickly as possible, and accuracy of channel measurement and efficiency of uplink data transmission are improved.

Still another embodiment of this application provides a method for transmitting a reference signal, to reduce indication information signaling overheads. Specifically, when UE has a plurality of different antenna panel structures, different antenna ports are located in different positions of antenna panels. Therefore, given a same quantity of reference signal antenna ports and same port numbers, because the reference signal antenna ports may be located in different panel patterns (panel pattern), the reference signal antenna ports may correspond to different codebook configurations.

As shown in FIG. 8, a distance between a port number 1 and a port number 2 in an antenna port panel pattern 2 (pattern 2) on a UE side is a large antenna distance (codebook configuration applicable to a large antenna distance), but a distance between a port number 1 and a port number 2 in a panel pattern 3 (pattern 3) is a small antenna distance (codebook configuration applicable to a small antenna distance). Therefore, codebook configurations corresponding to the antenna port panel pattern 2 and panel pattern 3 are different. The method provided by this embodiment is used to configure an optimal codebook for antenna ports in each panel pattern, for transmitting an uplink signal, so that uplink data transmission performance can be improved.

To optimize codebook configurations for the panel patterns on the UE side, specifically, a large precoding matrix set, that is, a codebook, is predefined on a base station and the UE side. Given a same quantity of antenna ports of the UE, the precoding matrix set or the codebook includes codewords in all different panel patterns. The base station selects an appropriate codebook subset or precoding matrix subset from the predefined large codebook or precoding matrix set according to coherent information of transmit antenna ports of the UE, and transmits a precoding matrix index corresponding to the codebook subset to the UE, so that the UE determines a weighting factor on the transmit antenna port according to the precoding matrix index, and transmits corresponding data. Therefore, the following is avoided: Because some antenna ports of the UE are blocked, the base station cannot receive corresponding signals that are transmitted, or signal transmission performance is relatively poor.

Figure 9:
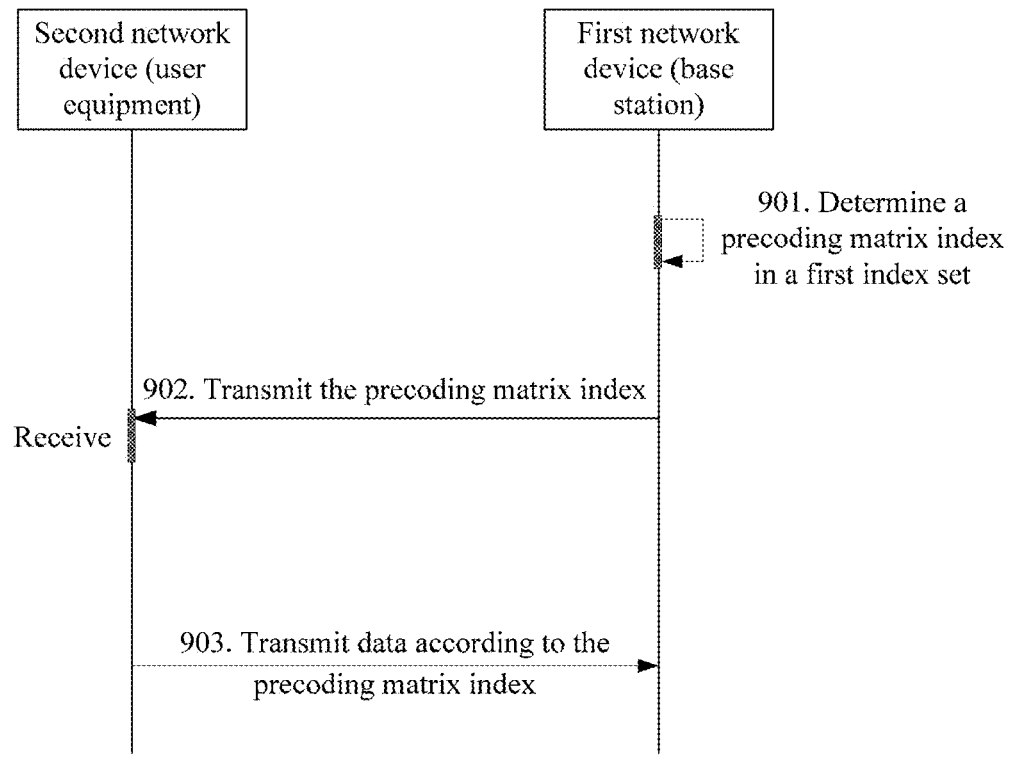
FIG. 9 is a schematic flowchart of a method for transmitting a signal according to an embodiment of this application.

Further, as shown in FIG. 9, the method provided by this embodiment includes the following steps:

Step 901: A base station determines a precoding matrix index in a first index set, where the precoding matrix index is used to determine a precoding matrix used when UE transmits data, each index in the first index set corresponds to a precoding matrix in a first precoding matrix set, the first precoding matrix set is a proper subset of a second precoding matrix set, and any precoding matrix index value in the first index set is less than or equal to a quantity of precoding matrices included in the first precoding matrix set.

Step 902: The base station transmits the precoding matrix index to the UE, and the UE receives the precoding matrix index determined by the base station in the first index set.

Optionally, the UE receives signaling transmitted by the base station, where the signaling carries the precoding matrix index, and the signaling includes at least one of higher layer signaling (for example, RRC signaling or RLC signaling), layer 1 signaling (for example, physical layer signaling, or DCI), or layer 2 signaling (for example, MAC CE signaling). An implementation is: the base station transmits the precoding matrix index to the UE by using DCI indication signaling.

Step 903: The UE transmits the data according to the precoding matrix index. For example, an uplink service data channel, or an uplink control channel, or an uplink reference signal such as an SRS, is transmitted.

A process in which the UE determines the precoding matrix according to the precoding matrix index transmitted by the base station specifically includes:

the UE receives information of the first precoding matrix set from the base station, where the information of the first precoding matrix set indicates a subset of the second precoding matrix set; and then the UE determines a codeword index according to the subset of the second precoding matrix set. Optionally, the base station may determine the information of the first precoding matrix set according to a result of measurement previously performed between the base station and the UE.

Specifically, as shown in the following Table 5, the second precoding matrix set includes a codebook or a precoding matrix set composed of precoding matrices corresponding to a total of 24 indexes from a precoding matrix index 0 to a precoding matrix index 23. Assuming that the precoding matrix set may be divided into three subsets (that is, there are three candidate first precoding matrix sets) corresponding to three index sets, and assuming that the corresponding index sets are 0 to 7, 8 to 15, and 16 to 23 respectively, an index in each index set corresponds to a precoding matrix. For example, a precoding matrix corresponding to the precoding matrix index "0" is $$\frac{1}{2}\begin{bmatrix} 1 \\ 1 \\ 1 \\ -1 \end{bmatrix},$$

assuming that the first index set includes precoding matrix indexes 0 to 7.

However, the precoding matrix set including the foregoing 24 precoding matrices is predefined on both the UE and the base station. Therefore, the information of the first precoding matrix set transmitted by the base station to the UE needs to include only a set number of a candidate index set, and is delivered to the UE by using the DCI indication signaling. Therefore, DCI indication signaling overheads are reduced.

Optionally, the UE receives, by using signaling, the information of the first precoding matrix set configured by the base station, where the signaling includes at least one of higher layer signaling (for example, RRC signaling or RLC signaling), layer 1 signaling (for example, physical layer signaling), or layer 2 signaling (for example, MAC CE signaling). An implementation is: the base station transmits the information of the first precoding matrix set to the UE by using the RRC signaling or the RLC signaling.

Another optional implementation is: before step 901, the UE reports the information of the first precoding matrix set to the base station, and the information of the first precoding matrix set is used to recommend, to the base station, which subset of the second precoding matrix set should be selected. The second precoding matrix set is a whole set of all precoding matrices of the UE in an antenna port quantity configuration. For example, the second precoding matrix set is a set including precoding matrices under all antenna panel structures, or a set including precoding matrices under all antenna distances.

After receiving the information of the first precoding matrix set, the base station determines the precoding matrix index, and delivers the precoding matrix index to the UE, so that the UE can transmit uplink data by using an optimal precoding matrix according to the precoding matrix index. In addition, because the precoding matrix index is an index of a precoding matrix renumbered and limited in the first precoding matrix set, the base station is prevented from transmitting, to the UE by using DCI, the precoding matrix index corresponding to the second precoding matrix set. In other words, in comparison with a method for indicating an index corresponding to the second precoding matrix set, DCI indication signaling can be reduced.

In this embodiment, the base station transmits the configured precoding matrix index to the UE, so that the UE can determine, according to the precoding matrix index, the precoding matrix used when the UE transmits the data. Because the matrix index is selected from the first precoding matrix set, and the first precoding matrix set is a proper subset of the second precoding matrix set, the precoding matrix index used by the UE can be indicated quickly. In addition, because the precoding matrix index is an index of a precoding matrix renumbered and limited in the first precoding matrix set, in comparison with the method for indicating an index corresponding to the second precoding matrix set, DCI indication signaling is reduced.

In addition, the UE reports the information of the first precoding matrix set to the base station, so that the base station can select an appropriate precoding matrix index for the UE according to the precoding matrix set recommended by the UE. Therefore, the precoding matrix corresponding to the precoding matrix index can adapt to a plurality of possible antenna panel structures on the UE side, optimal precoding matrix configurations in different antenna panel patterns are implemented, and performance of data transmission is improved.

In a specific embodiment, when the base station configures the precoding matrix index, M (M>1) precoding matrix sets are predefined in a system, where each precoding matrix set corresponds to an antenna port panel pattern, and a codeword indicated by each precoding matrix index corresponds to a precoding matrix in a precoding matrix set. That is, each precoding matrix index is an index of a precoding matrix renumbered in a precoding matrix set.

Figure 10:
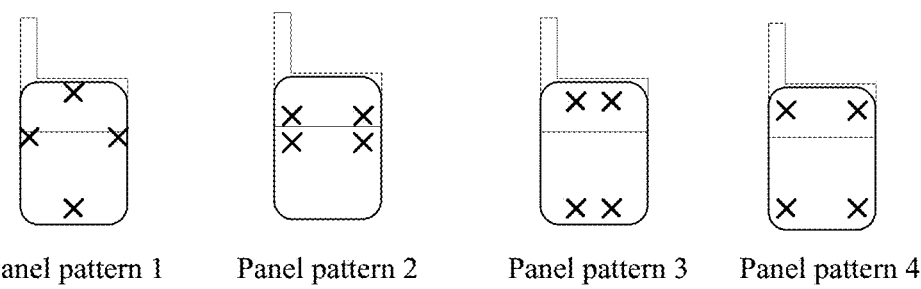
FIG. 10 is a schematic diagram of antenna panel patterns corresponding to different codeword structures according to an embodiment of this application.

As shown in FIG. 10, a codeword structure in the M precoding matrix sets predefined in the system is relevant to distribution of a plurality of antenna ports of the UE and antenna distances between the plurality of antenna ports.

pattern 4 (pattern 4) as some codewords applicable to large antenna distances. Optionally, the codewords applicable to large antenna distances may be codewords applicable to large antenna distances in a dual-codebook configuration of four antenna ports in an LTE-A system.

As shown in FIG. 10, codewords in precoding matrix sets corresponding to a panel pattern 2 (pattern 2) and a panel pattern 3 (pattern 3) are some codewords applicable to small antenna distances. For example, optionally, the codewords applicable to small antenna distances may be codewords applicable to small antenna distances in a dual-codebook configuration of four antenna ports in an LTE-A system. Further, because the antenna distances between the four antenna ports in the same polarization direction in the panel pattern 1 (pattern 1) and the panel pattern 4 (pattern 4) are different, different precoding matrix sets may be configured for the panel pattern 1 and the panel pattern 4 respectively. This is not specifically limited herein in this embodiment.

In addition, different panel patterns on the UE side correspond to different antenna port structures, but port blocking probabilities corresponding to different antenna port structures are different. Therefore, to avoid quality deterioration of a signal received by the base station from the UE due to blocking of a transmit antenna port of the UE, when configuring a precoding matrix set, the base station configures different precoding matrix sets for different antenna panel structures.

Optionally, a precoding matrix in the precoding matrix set may be formed by a column selection vector and phase rotation. For example, referring to the following Table 5, Table 5 shows a set of precoding matrices of four uplink antennas whose rank is 1, where indexes of codewords formed by column selection vectors and phase rotation in the foregoing precoding matrix set include indexes 16 to 23 in Table 5. According to different antenna panel structures on the UE side, different non-zero elements exist in composition of the precoding matrix configured by the base station.

TABLE 5

| Precoding matrix index Codebook index | Quantity of layers is 1 (rank is 1) Number of layers $\upsilon = 1$ | | | | | | | |
|---|---|---|---|---|---|---|---|---|
| 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16 to 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

Antenna distances between four antenna ports in a same polarization direction in a panel pattern 1 (pattern 1) and a panel pattern 4 (pattern 4) are relatively large. Therefore, when the base station configures a precoding matrix set, the base station sets codewords in precoding matrix sets corresponding to the panel pattern 1 (pattern 1) and the panel It is assumed that four antenna ports for transmitting uplink data are {40, 41, 42, 43}.

Precoding matrices whose indexes are 16 to 23 are precoding matrices determined by the base station and used in an antenna blocking scenario. That is, in this scenario, the precoding matrix set configured by the base station for the UE is a precoding matrix set corresponding to indexes 16 to 23 in the foregoing table. The precoding matrix indexes configured by the base station and received by the UE are 16 to 23. The UE determines, according to the precoding matrix index, the precoding matrix used when data is transmitted. For example, the UE includes two groups of antenna ports for transmitting a reference signal. One group of antenna ports is blocked, and consequently, quality of a signal received by the base station from the group of antenna ports deteriorates.

Figure 11:
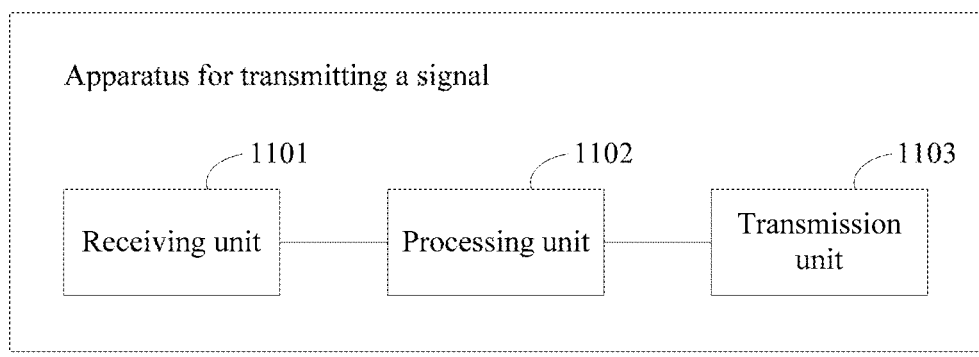
FIG. 11 is a schematic structural diagram of an apparatus for transmitting a signal according to an embodiment of this application.

Corresponding to the method for transmitting a signal according to this embodiment of this application, this embodiment further provides an apparatus for transmitting a signal. The apparatus is disposed in a terminal device. As shown in FIG. 11, specifically, the apparatus includes a receiving unit 1101, a processing unit 1102, and a transmission unit 1103.

The receiving unit 1101 is configured to receive a precoding matrix index determined by a base station in a first index set, where the precoding matrix index is used to determine a precoding matrix used when data is transmitted, each index in the first index set corresponds to a precoding matrix in a first precoding matrix set, the first precoding matrix set is a proper subset of a second precoding matrix set, and any precoding matrix index value in the first index set is less than or equal to a quantity of precoding matrices included in the first precoding matrix set.

The transmission unit 1103 is configured to transmit the data according to the precoding matrix index. For example, an uplink service data channel, or an uplink control channel, or an uplink reference signal such as an SRS, is transmitted.

Optionally, the receiving unit 1101 is further configured to receive information of the first precoding matrix set from the base station, where the information of the first precoding matrix set indicates a subset of the second precoding matrix set.

Optionally, the transmission unit 1103 is further configured to transmit information of the first precoding matrix set to the base station, where the information of the first precoding matrix set indicates a subset of the second precoding matrix set.

Optionally, the receiving unit 1101 is specifically configured to receive signaling transmitted by the base station, where the signaling carries at least one of the information of the first precoding matrix set and the precoding matrix index, and the signaling includes at least one of higher layer signaling, layer 1 signaling, and layer 2 signaling.

The information of the first precoding matrix set is transmitted by using RRC signaling or RLC signaling, and the precoding matrix index is transmitted by using DCI indication signaling.

Figure 12:
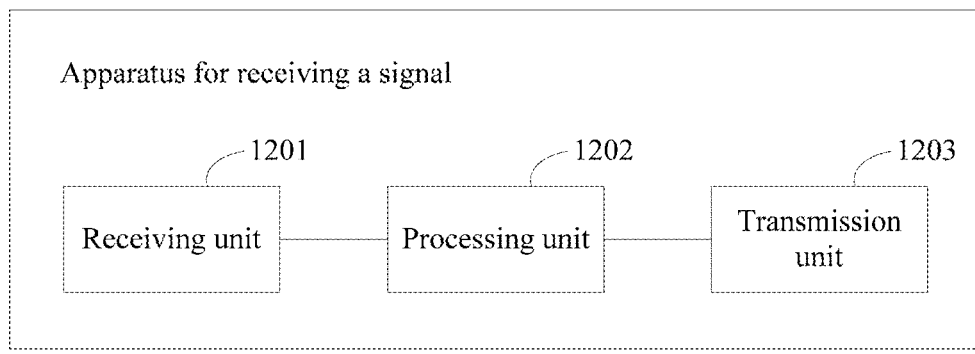
FIG. 12 is a schematic structural diagram of an apparatus for receiving a signal according to an embodiment of this application.

Corresponding to the foregoing apparatus for transmitting a signal, this embodiment further provides an apparatus for receiving a signal. As shown in FIG. 12, the apparatus is disposed in a base station. Further, the apparatus includes a receiving unit 1201, a processing unit 1202, and a transmission unit 1203.

The processing unit 1202 is configured to determine a precoding matrix index in a first index set, where the precoding matrix index is used to determine a precoding matrix used when a terminal device transmits data, each index in the first index set corresponds to a precoding matrix in a first precoding matrix set, the first precoding matrix set is a proper subset of a second precoding matrix set, and any index value in the first index set is less than or equal to a quantity of precoding matrices included in the first precoding matrix set.

The transmission unit 1203 is configured to transmit the precoding matrix index to the terminal device.

The receiving unit 1201 is configured to receive the data transmitted by the terminal device according to the precoding matrix index.

Optionally, the processing unit 1202 is further configured to configure information of the first precoding matrix set, where the information of the first precoding matrix set indicates a subset of the second precoding matrix set.

The transmission unit 1203 is further configured to transmit the information of the first precoding matrix set to the terminal device.

Optionally, the receiving unit 1201 is further configured to receive information of the first precoding matrix set transmitted by the terminal device.

The processing unit 1202 is further configured to determine a subset of the second precoding matrix set according to the information of the first precoding matrix set, and determine the precoding matrix index according to the subset of the second precoding matrix set.

Optionally, the transmission unit 1203 is specifically configured to transmit signaling, where the signaling carries the information of the first precoding matrix set, and the signaling includes at least one of higher layer signaling, layer 1 signaling, or layer 2 signaling. The transmission unit 1203 transmits the information of the first precoding matrix set to the terminal device by using RRC signaling or RLC signaling.

Optionally, the transmission unit 1203 is specifically configured to transmit signaling to the terminal device, where the signaling carries the precoding matrix index, and the signaling includes at least one of higher layer signaling, layer 1 signaling, or layer 2 signaling. The transmission unit 1203 transmits the precoding matrix index to the terminal device by using DCI signaling.

In a specific hardware implementation, this application further provides a terminal device, for example, UE, configured to implement the steps in the foregoing method embodiment.

Figure 13:
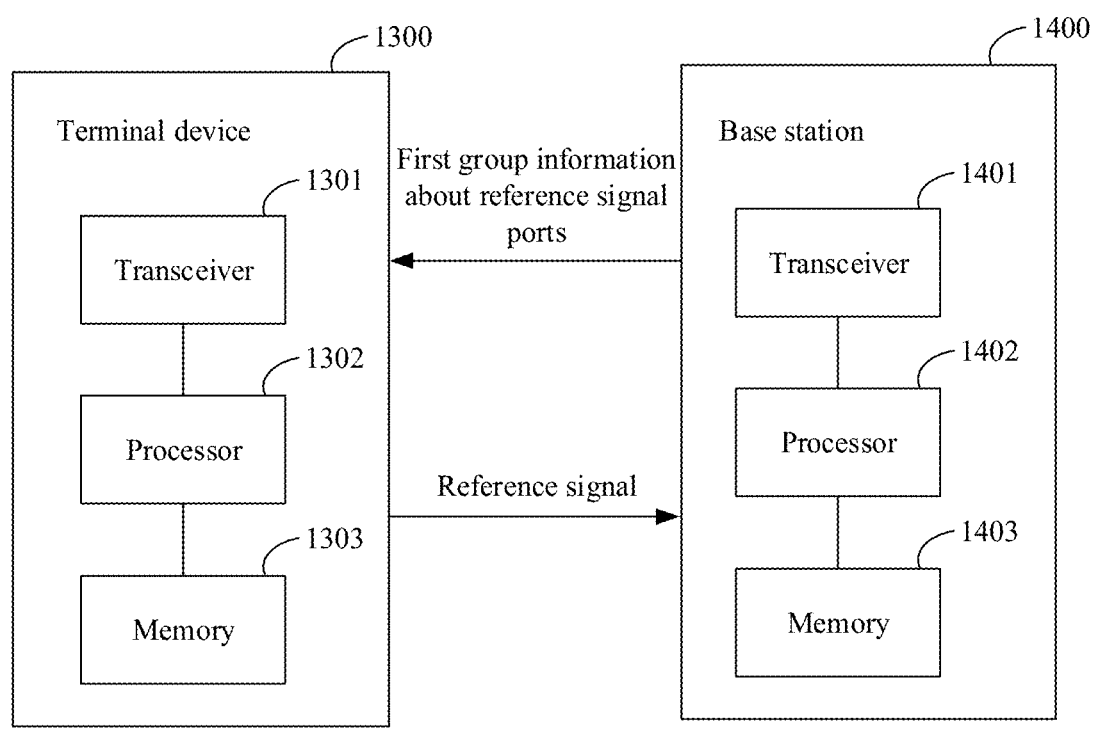
FIG. 13 is a schematic structural diagram of a reference signal transmitting system according to an embodiment of this application.

Referring to FIG. 13, the terminal device may include a transceiver 1301, a processor 1302, a memory 1303, and the like.

Specifically, the processor 1302 is a control center of the terminal device. The processor 1302 uses various interfaces and lines to connect each part of the whole terminal device, and performs various functions and/or data processing of the terminal device by running or executing a software program and/or module stored in the memory and invoking data stored in the memory.

The processor 1302 may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1303 may include a volatile memory (volatile memory), for example, a random access memory (random access memory, RAM); and may further include a non-volatile memory (non-volatile memory), for example, a flash memory (flash memory), a hard disk drive (hard disk drive, HDD), or a solid-state drive (solid-state drive, SSD).

The memory may further include a combination of the foregoing types of memories.

The transceiver 1301 may be configured to receive or transmit data. Under control of the processor, the transceiver may transmit data to each node or other devices in a video network system. Under control of the processor, the transceiver may receive data transmitted by each node or other devices.

In this embodiment of this application, the transceiver 1301 may be configured to receive reference signal port group information transmitted by the first network device, transmit a reference signal to the first network device, and the like in the foregoing embodiment. In FIG. 6 of the foregoing apparatus embodiment, functions to be implemented by the receiving unit 601 may be implemented by the transceiver 1301 of the terminal device, or implemented by the transceiver 1301 controlled by the processor 1302. Functions to be implemented by the processing unit 602 in FIG. 6 may also be implemented by the processor 1302 of the terminal device.

As shown in FIG. 13, this embodiment further provides a schematic structural diagram of a network device, configured to implement the method for receiving a reference signal in the foregoing embodiment. The network device may be the first network device in any one of the foregoing embodiments, for example, a base station.

The base station may include a transceiver 1401, a processor 1402, a memory 1403, and the like.

The processor 1402 is a control center of the network device (base station). The processor 1402 uses various interfaces and lines to connect each part of the whole network-side device, and performs various functions and/or data processing of the network-side device by running or executing a software program and/or module stored in the memory and invoking data stored in the memory. The processor may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1403 may include a volatile memory (volatile memory), for example, a random access memory (random access memory, RAM); and may further include a non-volatile memory (non-volatile memory), for example, a flash memory (flash memory), a hard disk drive (hard disk drive, HDD), or a solid-state drive (solid-state drive, SSD). The memory may further include a combination of the foregoing types of memories. The memory may store a program or code. The processor in the network element may implement functions of the network element by executing the program or code.

The transceiver 1401 may be configured to receive or transmit data. Under control of the processor, the transceiver may transmit data to a terminal device or other network-side devices. Under control of the processor, the transceiver receives data transmitted by the terminal device or other network-side devices.

In this embodiment of this application, the transceiver 1401 may be configured to implement the steps in the method for receiving a reference signal in FIG. 2 of the foregoing embodiment, and functions of the apparatus embodiment in FIG. 7. Functions to be implemented by the receiving unit 701 in FIG. 7 may be implemented by the transceiver 1401 of the base station, or implemented by the transceiver 1401 controlled by the processor 1402; functions to be implemented by the transmission unit 703 may also be implemented by the transceiver 1401 of the base station, or may be implemented by the transceiver 1401 controlled by the processor 1402; and functions to be implemented by the processing unit 702 may be implemented by the processor 1402.

In addition, the terminal device 1300 and the base station 1400 in this embodiment are further configured to implement all method procedures shown in FIG. 9 of the foregoing method embodiment. Further, the terminal device 1300 is configured to implement all or some functions of the apparatus for transmitting a signal as shown in FIG. 11 of the foregoing apparatus embodiment, and the base station 1400 is configured to implement all or some functions of the apparatus for receiving a signal as shown in FIG. 12 of the foregoing apparatus embodiment. Specifically, functions of all units may be implemented by corresponding transceivers and processors.

In a specific implementation, this application further provides a computer storage medium. The computer storage medium may store a program. When the program is executed, some or all steps included in the embodiments of the method for transmitting a reference signal, the method for receiving a reference signal, the method for transmitting a signal, and the method for receiving a signal according to this application may be performed. The storage medium may be a magnetic disk, an optical disc, a read-only memory (read-only memory, ROM), a random access memory (random access memory, RAM), or the like.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of this application.

For same or similar parts in the embodiments in the specification, mutual reference may be made. Especially, the foregoing embodiment is basically similar to a method embodiment, and therefore is described briefly; for related parts, reference may be made to descriptions in the method embodiment.

The foregoing descriptions are implementations of this application, but are not intended to limit the protection scope of this application.

What is claimed is:

1. A method for transmitting signal, wherein the method comprising:

receiving, by a terminal device, downlink control information (DCI) from a network device, wherein the DCI includes a signaled precoding matrix index, wherein the signaled precoding matrix index is an index renumbered from a corresponding index in a first index set, and the signaled precoding matrix index is different from the corresponding index, at least one index in the first index set is greater than a quantity of the first index set, the signaled precoding matrix index is less than the quantity of the first index set, the signaled precoding matrix index is used to determine a precoding matrix for transmitting data by the terminal device, each index in the first index set corresponds to a precoding matrix in a first precoding matrix set, a second precoding matrix set comprises a plurality of precoding matrix sets including the first precoding matrix set, and the first precoding matrix set is a proper subset of the second precoding matrix set; and transmitting, by the terminal device, the data according to the signaled precoding matrix index.

2. The method according to claim 1, wherein before the receiving, by a terminal device, DCI from a network device, the method further comprises:

receiving, by the terminal device, information of the first precoding matrix set from the network device, wherein the information of the first precoding matrix set indicates the first precoding matrix set.

3. The method according to claim 2, wherein information of the first precoding matrix set is included in a higher layer signaling message from the network device.

4. The method according to claim 1, wherein the first precoding matrix set is determined according to coherent information of transmit antenna ports of the terminal device.

5. An apparatus for transmitting signal, comprising:

a receiver, configured to receive downlink control information (DCI) from a network device, wherein the DCI includes a signaled precoding matrix index, wherein the signaled precoding matrix index is an index renumbered from a corresponding index in a first index set, and the signaled precoding matrix index is different from the corresponding index, at least one index in the first index set is greater than a quantity of the first index set, the signaled precoding matrix index is less than the quantity of the first index set, the signaled precoding matrix index is used to determine a precoding matrix for transmitting data by the apparatus, each index in the first index set corresponds to a precoding matrix in a first precoding matrix set, a second precoding matrix set comprises a plurality of precoding matrix sets including the first precoding matrix set and the first precoding matrix set is a proper subset of the second precoding matrix set; and a transmitter, configured to transmit the data according to the signaled precoding matrix index.

6. The apparatus according to claim 5, wherein:

the receiver is configured to receive information of the first precoding matrix set from the network device, wherein the information of the first precoding matrix set indicates the first precoding matrix set.

7. The apparatus according to claim 6, wherein information of the first precoding matrix set is included in a higher layer signaling message from the network device.

8. The apparatus according to claim 5, wherein the first precoding matrix set is determined according to coherent information of transmit antenna ports of the apparatus.

9. A method for receiving signal, wherein the method comprising:

determining, by a network device, a signaled precoding matrix index, wherein the signaled precoding matrix index is an index renumbered from a corresponding index in a first index set, and the signaled precoding matrix index is different from the corresponding index, at least one index in the first index set is greater than a quantity of the first index set, the signaled precoding matrix index is less than the quantity of the first index set, the signaled precoding matrix index is used to determine a precoding matrix for transmitting data by a terminal device, each index in the first index set corresponds to a precoding matrix in a first precoding matrix set, a second precoding matrix set comprises a plurality of precoding matrix sets including the first precoding matrix set, the first precoding matrix set is a proper subset of the second precoding matrix set;

transmitting, by the network device, downlink control information (DCI) to the terminal device, wherein the DCI includes the signaled precoding matrix index; and receiving, by the network device, the data transmitted by the terminal device according to the signaled precoding matrix index.

10. The method according to claim 9, wherein before the determining, by a network device, a precoding matrix index in a first index set, the method further comprises:

configuring, by the network device, information of the first precoding matrix set, wherein the information of the first precoding matrix set indicates the first precoding matrix set; and transmitting, by the network device, the information of the first precoding matrix set to the terminal device.

11. The method according to claim 10, wherein information of the first precoding matrix set is included in a higher layer signaling message sent by the network device.

12. The method according to claim 9, wherein the first precoding matrix set is determined according to coherent information of transmit antenna ports of the terminal device.

* * * * *